Jan. 29, 1957  R. STEINITZ  2,779,580
HIGH TEMPERATURE FURNACES AND THEIR PRODUCTION
Filed July 26, 1954
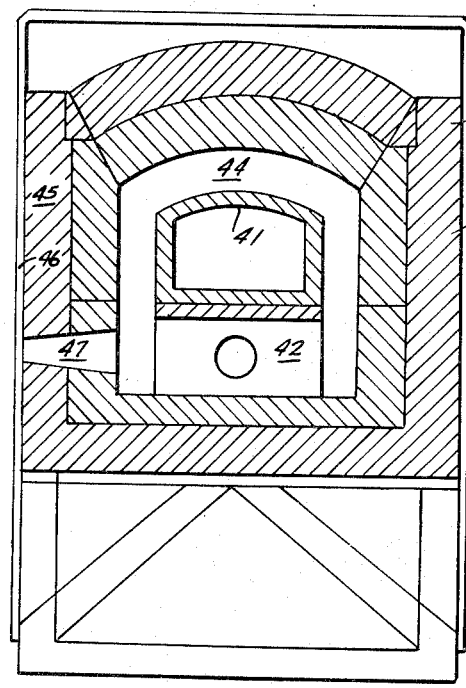
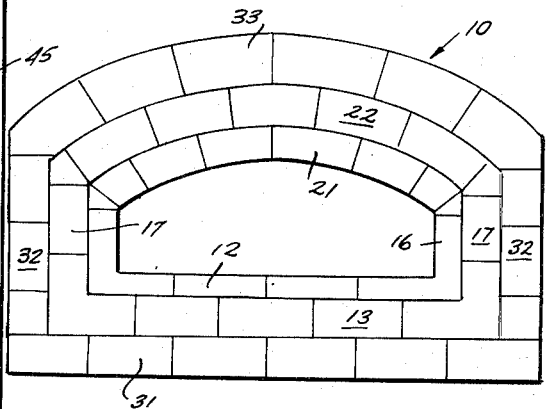
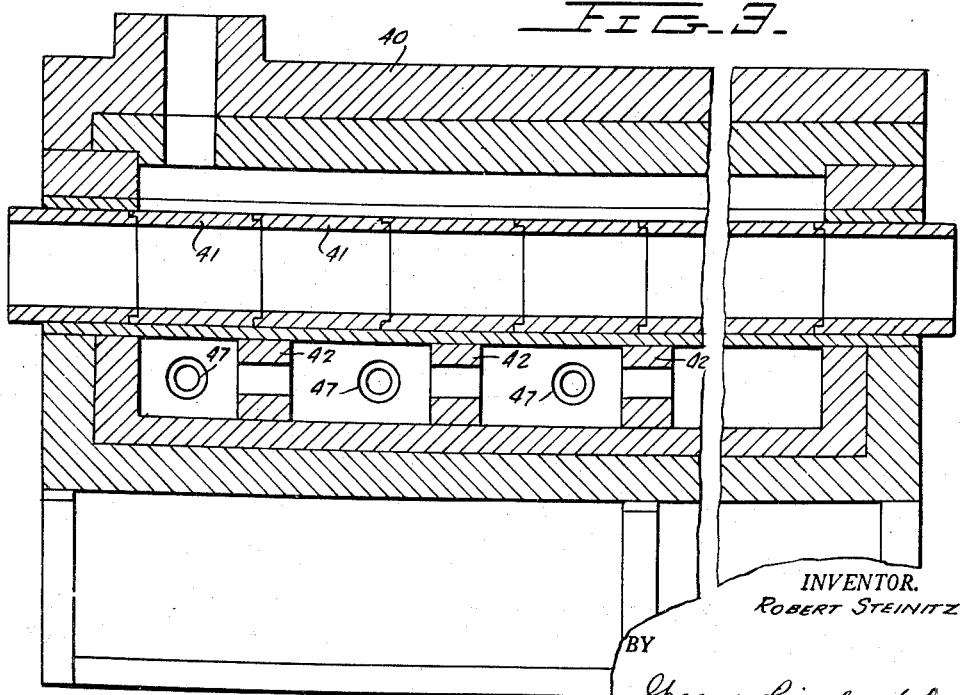
INVENTOR.
ROBERT STEINITZ
BY
Greene, Pineles & Durr
ATTORNEYS

United States Patent Office 2,779,580
Patented Jan. 29, 1957

2,779,580

HIGH TEMPERATURE FURNACES AND THEIR PRODUCTION

Robert Steinitz, New York, N. Y., assignor to Schwarzkopf Development Corporation, a corporation of Maryland Application July 26, 1954, Serial No. 445,787

2 Claims. (Cl. 263—41)

The invention relates to high temperature furnaces and processes for making the same.

In high temperature furnaces, for use in treating metals at high temperatures, or for firing porcelain and similar applications, it is of great importance to provide an inner furnace lining of high heat conductivity so as to assure that all parts of the interior heated furnace space are maintained at a substantially uniform temperature. In the past, it has been found that to achieve such uniform high furnace temperature, it is best to use as the interior furnace lining, or at least for the furnace hearth, bricks of silicon carbide because of its high heat conductivity. However, bricks of silicon carbide have serious limitations and disadvantages. They burn in oxidizing atmospheres at 1350° C. and sublime at 1600° C. even in a neutral atmosphere or in vacuum. In addition, they produce in the furnace a carburizing atmosphere which is in many applications, harmful to the object that is being heated.

Among the objects of the invention is a high temperature furnace having an interior furnace lining, or at least a part of the interior furnace lining formed of furnace brick of high heat conductivity capable of assuring a uniform distribution of heat, which brick at the same time does not burn in oxidizing atmospheres or form a reducing or carburizing atmosphere at the high internal furnace temperature.

Among other objects of the invention is a high temperature furnace having as interior furnace lining a high temperature brick of high heat conductivity, which brick is stable in oxidizing atmospheres up to 1700° C. and which brick does not melt below 2000° C. and does not decompose or sublime below its melting temperature.

Among other objects of the invention is to provide an improved conveyor belt for high temperature furnaces.

This invention is based on the discovery that high temperature furnaces can be heated to much higher temperatures than possible in the past and maintained at uniform temperatures by making the interior furnace lining at least in part of bricks consisting of molybdenum disilicide.

The foregoing and other objects of the invention will be best understood from the following description of exemplifications thereof, reference being had to the accompanying drawing in which:

Fig. 1 is a partially diagrammatic cross-sectional view of constructional features of a high temperature furnace exemplifying the invention.

Fig. 2 is a cross-sectional view of a muffle furnace made according to the invention.

Fig. 3 is a longitudinal cross-sectional view of the furnace of Fig. 2.

As explained above, in constructing high temperature furnaces, it has been found in the past necessary to use bricks of silicon carbide either for the entire inner lining layer of the furnace or at least for the hearth of the furnace in order to assure that all parts of the heated interior furnace space are maintained at and are brought quickly to a substantially uniform temperature. It was also long known that the use of silicon carbide bricks as interior furnace lining of high temperature furnaces has certain disadvantages compared to furnaces having an interior lining of common firebricks. Among the disadvantages of silicon carbide bricks is the fact that silicon carbide burns in an oxidizing atmosphere at about 1350° C. and thus limits the maximum temperature to which such furnace may be heated. In addition, silicon carbide sublimes even in a neutral atmosphere or in vacuum and accordingly, a furnace having such brick lining could not be heated to 1600° C. even if vacuum or a neutral atmosphere is maintained in the interior furnace space. Furthermore, the presence of silicon carbide bricks in the interior of the heated furnace results in the production of carburizing or reducing furnace atmospheres which in many cases impair the characteristics of the objects heated or treated in the furnace. By way of example, in heating ceramic ware in a high temperature furnace having an interior of silicon carbide bricks, specks of graphite are deposited on the ceramic ware thereby impairing its quality. For this reason, high temperature furnaces have an interior lining with only the hearth plate formed of silicon carbide bricks with the major area of the inner furnace lining consisting of the conventional firebricks.

According to the invention, the difficulties encountered with the use of silicon carbide bricks as the inner lining for high temperature furnaces are eliminated by making such high temperature furnaces with an inner lining of bricks consisting predominantly or in their entirety essentially of moybdenum disilicide $MoSi_2$ or chromium disilicide $CrSi_2$.

Such bricks of the invention are very effective because of their high heat conductivity, resistance to oxidation, resistance to temperatures of up to 2000° C., and high heat shock resistance. Furnaces made of such bricks may be heated for long periods of time to temperatures as high as 1800° C.

In particular, the heat conductivity of a molybdenum disilicide $MoSi_2$ brick is about .075 cal./cm./C.°/sec. If desired, this high heat conductivity of such bricks can be reduced by making them porous or hollow without decreasing the heat or oxidation resistance of the brick.

There will now be described by way of exemplification in connection with the figures of the drawing, several forms of structural features of high temperature furnaces exemplifying the principles of the invention. The furnace 10 of Fig. 1 has a floor comprising an inner layer of bricks 12 and an outer layer of bricks 13, two opposite side walls comprising similarly an inner layer of bricks 16 and an outer layer of bricks 17 and a top wall comprised similarly of an inner layer of bricks 21 and an outer layer of bricks 22. The additional outer bricks 31, 32, 33 of the furnace which surround its two inner brick layers 12, 13, 16, 17, 21, 22 are formed of conventional firebricks consisting essentially of clay or the like. The bricks 12, 16 and 21 which form the inner layer of the furnace are all of molybdenum disilicide $MoSi_2$ or chromium disilicide $CrSi_2$ or a 50/50% combination of $MoSi_2$ and $CrSi_2$.

Good results are obtained by making the inner lining of the high temperature furnace out of a layer of dense molybdenum disilicide bricks and making the next outer layer of the furnace of molybdenum disilicide bricks having high porosity so as to reduce their heat conductivity and reduce the loss of heat from the furnace while contributing to the high heat conductivity of the inner layer formation of the furnace. Instead of making the outer layer of the furnace lining of porous $MoSi_2$ bricks, it may be made out of hollow $MoSi_2$ bricks.

Instead of using as inner furnace lining, bricks consisting entirely of $MoSi_2$, it is of advantage to make these bricks of a combination of $MoSi_2$ and $CrSi_2$ in 50/50% proportions (by weight). By making the bricks of $MoSi_2$ and $CrSi_2$ in 50/50% proportions, there are obtained bricks of the superior oxidation resistance because in such proportions, the two disilicides go into solid solution.

In assembling a top wall of the furnace with a double layer 21, 22 of bricks, it might be desirable to assemble each pair of the two similarly shaped bricks which are to form the inner and outer layers of the top wall before cementing the bricks into the wall. If desired, only the floor portion of the furnace may be lined with the disilicide bricks. Aluminum oxide bricks, for example, are low cost, highly effective refractory bricks with low conductivity and are well adapted to be employed with the bricks of the invention.

The heating structures of the furnace are not shown since they are not a part of the present invention. Since the furnace is resistant to high temperatures and oxidizing conditions it does not make any difference what means is employed to heat the furnace. For example, it may be heated electrically by resistance heater or by fuel gas.

Figs. 2 and 3 show a muffle type furnace which is adapted to be heated by gas. In this furnace 40, the muffle parts 41 are made of the $MoSi_2$, $CrSi_2$ or mixtures thereof. The muffle is supported on a plurality of fire bricks 42 in a spaced position from walls 43 so as to form a chamber 44 between muffle 41 and walls 43. Walls 43 are supported on the outside by brick walls 45. Metal braces 46 surround the outside wall 45. Openings 47 are provided for firing the furnace.

A very satisfactory way of making the muffle parts 41, etc., is by extrusion. A finely powdered mixture of 50% molybdenum disilicide and 50% chromium disilicide are mixed with water and a binder such as carbonoxymethyl cellulose or water soluble methyl cellulose to form a coherent paste, which is then extruded to the form desired. From ½ to 4% of the binder is satisfactory. After extrusion the parts are sintered at 1600° C. to 1900° C. to burn off the binder and cement the particles together.

The features and principles underlying the invention described above in connection with specific exemplifications will suggest to those skilled in the art many other modifications thereof. It is accordingly desired that the appended claims shall not be limited to any specific features or details shown and described in connection with the exemplifications thereof.

I claim:

1. In a high temperature furnace having furnace walls enclosing an interior furnace space which is maintained for long periods of time at elevated temperatures of at least about 1600° C., at least one major furnace wall section facing said furnace space being formed of bricks consisting essentially of a solid solution of molybdenum disilicide and chromium disilicide.

2. In a high temperature furnace as claimed in claim 1, said bricks consisting essentially of a solid solution of molybdenum disilicide and chromium disilicide with each of said two disilicides constituting about 50% of the total disilicide content.

References Cited in the file of this patent

UNITED STATES PATENTS

| | | |
|---|---|---|
| 1,517,172 | Rudd | Nov. 25, 1924 |
| 2,075,694 | Benner et al. | Mar. 30, 1937 |
| 2,116,399 | Marth | May 3, 1938 |
| 2,116,400 | Marth | May 3, 1938 |
| 2,576,169 | Ashton | Nov. 27, 1951 |
| 2,612,443 | Goetzel et al. | Sept. 30, 1952 |
| 2,665,474 | Beidler et al. | Jan. 12, 1954 |

OTHER REFERENCES

Machinist, Volume 97, Number 23, pages 927–930, inclusive, published in England; McGraw-Hill (United States agent).

Metal Powder Report, Volume 6, Number 11, July 1952, page 176, published in London, England, by I. Powder Metallurgy, Ltd.